United States Patent
McLemore et al.

(10) Patent No.: US 10,478,016 B2
(45) Date of Patent: Nov. 19, 2019

(54) GAS-FIRED SMOKER WITH DIGITAL TEMPERATURE CONTROL

(71) Applicant: Masterbuilt Manufacturing, Inc., Columbus, GA (US)

(72) Inventors: John D McLemore, Hamilton, GA (US); Joseph L Turner, Butler, GA (US); Adam Carter, Auburn, AL (US); Robert Terrell, Waverly, AL (US); Daniel Mercer, West Point, GA (US)

(73) Assignee: Masterbuilt Manufacturing, Inc., Columbus, GA (US)

( * ) Notice: Subject to any disclaimer, the term of this patent is extended or adjusted under 35 U.S.C. 154(b) by 656 days.

(21) Appl. No.: 15/170,117

(22) Filed: Jun. 1, 2016

(65) Prior Publication Data

US 2016/0353929 A1    Dec. 8, 2016

Related U.S. Application Data

(60) Provisional application No. 62/172,475, filed on Jun. 8, 2015.

(51) Int. Cl.
*A23B 4/044* (2006.01)
*A47J 37/07* (2006.01)
*A23B 4/052* (2006.01)

(52) U.S. Cl.
CPC ........... *A47J 37/0727* (2013.01); *A23B 4/052* (2013.01)

(58) Field of Classification Search
CPC .... A47J 37/0713; A47J 37/07; A47J 37/0704; A47J 37/0718; A47J 37/0727
See application file for complete search history.

(56) References Cited

U.S. PATENT DOCUMENTS

| | | | |
|---|---|---|---|
| 4,549,527 A | 10/1985 | Davis | |
| 4,924,071 A * | 5/1990 | Jacobs | A23B 4/0053 219/400 |
| 5,934,183 A * | 8/1999 | Schlosser | A47J 37/0786 126/25 R |
| 5,947,370 A | 9/1999 | Davis | |

(Continued)

FOREIGN PATENT DOCUMENTS

EP    1111306    6/2001

OTHER PUBLICATIONS

Search Report received by European Patent Office dated Jan. 19, 2019.

*Primary Examiner* — Dana Ross
*Assistant Examiner* — Lawrence H Samuels
(74) *Attorney, Agent, or Firm* — Smith Gambrell & Russell LLP (57) ABSTRACT

A gas-fired smoker constitutes a cabinet for holding food products to be cooked. A gas burner in the cabinet is connected to a source of flammable gas by means of a valve. The gas burner heats the cabinet and thereby cooks the food products. In one embodiment a pilot light ignites the flammable gas at the gas burner. A control circuit powered by a DC source controls the operation of the gas-fired smoker including igniting and extinguishing the gas burner in order to maintain a cooking temperature in the cabinet. A battery powers the control system. In another embodiment a rechargeable battery is recharged by a Seebeck thermal electric generator that is exposed to the heat from the gas burner.

7 Claims, 12 Drawing Sheets

(56) References Cited

U.S. PATENT DOCUMENTS

| | | | |
|---|---|---|---|
| 7,018,200 B2* | 3/2006 | Querejeta | F23D 14/725 126/39 G |
| 7,703,389 B2 | 4/2010 | McLemore | |
| 7,793,649 B2* | 9/2010 | Barkhouse | F23N 1/002 126/19 R |
| 8,227,728 B2* | 7/2012 | Best | A47J 37/0635 219/411 |
| 9,215,948 B2* | 12/2015 | Fetterman | A47J 36/2405 |
| 2005/0098169 A1* | 5/2005 | Frederiksen | A47J 37/0713 126/41 R |
| 2006/0137543 A1* | 6/2006 | McLemore | A23B 4/052 99/482 |
| 2009/0126714 A1* | 5/2009 | Barkhouse | F23N 1/002 126/39 G |
| 2010/0310733 A1* | 12/2010 | Hoffman | F24C 7/00 426/233 |
| 2011/0219958 A1* | 9/2011 | Noble | A23B 4/044 99/473 |
| 2011/0268853 A1* | 11/2011 | Cohen | A23B 4/044 426/315 |
| 2012/0097146 A1* | 4/2012 | Schonemann | F24C 3/008 126/6 |
| 2013/0092032 A1* | 4/2013 | Cafferty | F24C 7/08 99/325 |
| 2013/0196038 A1 | 8/2013 | Liu | |
| 2013/0220143 A1* | 8/2013 | Fetterman | A47J 36/2405 99/330 |
| 2015/0132456 A1* | 5/2015 | Cohen | A23B 4/044 426/312 |
| 2015/0201805 A1* | 7/2015 | Cedar | A47J 37/0754 126/25 R |
| 2017/0238565 A1 | 8/2017 | Giebel | |

* cited by examiner

Fig. 10

GAS-FIRED SMOKER WITH DIGITAL TEMPERATURE CONTROL

CLAIM OF PRIORITY

This application claims priority from U.S. Provisional Patent Application Ser. No. 62/172,475, filed on Jun. 8, 2015, which is incorporated herein in its entirety.

FIELD OF THE INVENTION

This invention relates to a smoker for slowly cooking food while imparting a smoked flavor to the food, and more particularly to controlling the temperature and smoking process of a gas-fired smoker.

BACKGROUND OF THE INVENTION

A conventional smoker assembly includes an cabinet containing one or more grill racks spaced vertically within the cabinet, a drip pan positioned below the grill for collecting food drippings, a water pan in the bottom of the cabinet, a heat source at the bottom of the cabinet, and a tray, placed adjacent the heat source, to hold the smoke generating material. Typical smoke generating material is wood and may include hickory, alder, and mesquite wood in a variety of forms including chips, briquettes, pellets, and saw dust. The heat source may include an electric heating element, a gas-fired burner, or combustible materials such as charcoal.

Smokers for slowly cooking food while imparting a smoke flavor to the food are illustrated, for example, in U.S. Pat. Nos. 7,426,885; 7,703,389; 5,713,267; 4,417,748; 4,309,938; 4,020,322; and 3,776,127. In addition, smokers that are designed as an added feature to a grill assembly are disclosed in U.S. Pat. Nos. 5,891,498; 5,718,165; 5,167,183; and 4,770,157. In addition, the prior art discloses a variety of apparatus for generating smoke and conveying the smoke to the food being smoked including U.S. Pat. Nos. 4,321,857; 6,209,533; and 5,138,939.

The smoking process is generally carried out at low to moderate temperatures over an extended period of time. For example, the internal temperature of the smoker is generally about 220° F.-230° F. At such temperatures, the smoking process generally takes about six hours. One smoking method, the 3-2-1 method, is often employed to smoke meat. For the first three hours, the meat is left uncovered on the smoker's grill rack so that the meat is surrounded by the smoke and thereby absorbs the smoke flavor from the heated wood chips. For the next two hours, the meat is wrapped in aluminum foil in order to steam and tenderize the meat. For the last hour, the meat is again left uncovered. The smoking process may also include basting the meat as the juices from the meat are caught in the drip pan and reapplied to the meat to keep the meat moist. In addition, the juices caught in the drip pan vaporize to maintain a moist atmosphere within the smoker cabinet thereby keeping the meat hydrated. The water pan also holds water or other flavor imparting liquids which, in conjunction with the heat source, add moisture to the atmosphere inside the smoker.

During the smoking a process, the internal temperature of the meat slowly rises, as a result of the heat created by the heat source at the bottom of the smoker, until the internal temperature of the meat reaches at least a safe level for consumption or to a higher level to suit the taste of the user.

Maintaining a constant set temperature in a smoker is important to ensure consistent results during the extended smoking process. Maintaining a constant temperature is affected by several factors including changes in atmospheric conditions outside of the smoker such as the presence of wind or rain, the temperature variation created by the introduction of the food products such as meat into the smoker, and the opening and closing of the door of the smoker to baste the meat, to add smoke generating material to the tray, or to check on the progress of the smoking process.

For gas-fired smokers, controlling the internal temperature of the smoker cabinet within an acceptable range of variation is more difficult than controlling the temperature of an electric smoker. Several considerations are present when controlling the internal temperature of a gas-fired smoker. The control system for a gas-fired smoker must react quickly to changes in internal temperature of the smoker cabinet to maintain a relatively constant temperature while conserving gas, particularly when the smokers are used at a remote location. Consequently, the gas-fired smoker should relieve the user from constantly adjusting the temperature of the smoker cabinet as the environment around the gas-fired smoker changes over the extended duration of the smoking process.

In addition, the gas-fired smoker should have the capability of terminating the smoking process either after a pre-determined time period has elapsed or when the internal temperature of the food product reaches a pre-determined internal temperature.

Because of the smoker is gas-fired, safety measures should be implemented to ensure that gas cannot build up in or around the smoker and create a fire or explosion hazard.

SUMMARY OF THE INVENTION

The gas-fired smoker of the present invention has a digital control system that controls the internal temperature of the cabinet of the gas-fired smoker within an acceptable temperature range. The gas-fired smoker of the present invention also terminates the smoking process either at the end of a predetermined time or when the internal temperature of the food product reaches a predetermined internal temperature. The gas-fired smoker of the present invention further employs a safety mechanism to ensure that gas cannot build up in the cabinet of the smoker thereby leading to a fire or explosion hazard.

In a first embodiment of a gas-fired smoker of the present invention, the stand-alone gas-fired smoker includes a control circuit with a controller. The controller controls the startup, operation, and shutdown of the stand-alone gas smoker. The gas burner is lit by means of a gas pilot light. The pilot light is initially ignited either by means of a piezo igniter or an electronic spark device. The controller cycles the gas burner on and off by opening and closing a gas solenoid valve between the gas source and the gas burner in order to maintain a preset cooking temperature within the cabinet of the smoker. The control circuit includes a display and input panel for displaying the status of the operation of the gas-fired smoker and for accepting user input, a timer set module for setting the cooking time for the gas-fired smoker, a cabinet temperature set module for setting the temperature inside the smoker cabinet, a temperature sensor for determining the temperature inside the cabinet, a probe temperature set module for setting the final internal temperature for the food, particularly meat, and a food probe for determining the internal temperature of the food. The cabinet temperature sensor is located in the cabinet at a position that accurately reflects the average temperature within the cabinet.

In a second embodiment of a gas-fired smoker in accordance with the present invention, the gas-fired smoker has a digital control circuit with a controller that controls the startup, operation, and shutdown of the stand-alone gas smoker. The second embodiment of the gas-fired smoker is similar to the first embodiment of the gas-fired smoker except the control circuit of the second embodiment includes a rechargeable battery for powering the control circuit and means for recharging the battery. In order to maintain the rechargeable battery over an extended period of time during the smoking process, the second embodiment gas-fired smoker of the present invention includes a thermal electric generator, such as a Seebeck thermal electric generator, to convert the heat from the gas-fired smoker into electric current to recharge the battery for the control circuit including the electric igniter. The Seebeck thermal electric generator also can provide current for an external USB port, for lighting, and for charging electronic devices such as cell phones, tablets, or MP3 players.

Further objects, features and advantages will become apparent upon consideration of the following detailed description of the invention when taken in conjunction with the drawings and the appended claims.

DETAILED DESCRIPTION OF THE PREFERRED EMBODIMENT

FIGS. 1-7 illustrate a stand-alone gas smoker 10 having control features in accordance with the present invention. The stand-alone gas smoker 10 includes a cabinet 12 mounted on legs 14. The cabinet 12 has a top 2, a bottom 3, a back 4, and sides 5. An upper front door 15 provides access to the interior of the cabinet 12 where food to be cooked is supported on vertically spaced grill racks 17. The food in the smoker 10 is heated and slowly cooked by heat from a gas burner 20 located near the bottom 3 of the smoker 10. The gas burner 20 is connected to a source (tank) 18 of flammable gas through a burner control mechanism 100 that includes a gas solenoid valve 22 that controls the on/off flow of gas to the gas burner 20 during the smoking process.

The stand-alone gas smoker 10 has a wood tray 24 that holds woodchips that, when heated by the gas burner 20, produce smoke to impart a smoked flavor to the food within the cabinet 12 as the food is slowly cooked. In addition, the gas smoker 10 may include a drip pan 28 adjacent the bottom 3 of the cabinet 12 to catch drippings from the food. A liquid pan 26 adjacent the gas burner 20 is filled with liquid that may include water or other flavor imparting liquids. As the liquid in the liquid pan 26 is heated, the resulting liquid vapor serves to impart additional flavoring to the food and to maintain a moist atmosphere inside the cabinet 12 and thus keeps the food from drying out during the slow cooking process. A lower front door 16 provides access to the wood tray 24, the liquid pan 26, the drip pan 28, and the gas burner 20. The wood tray 24 is attached to the inside of the lower front door 16 and swings outwardly with the lower front door 16 for easy access to replenish the smoke producing material. A heat shield 19 is located below the burner control mechanism 100.

Figure 1:
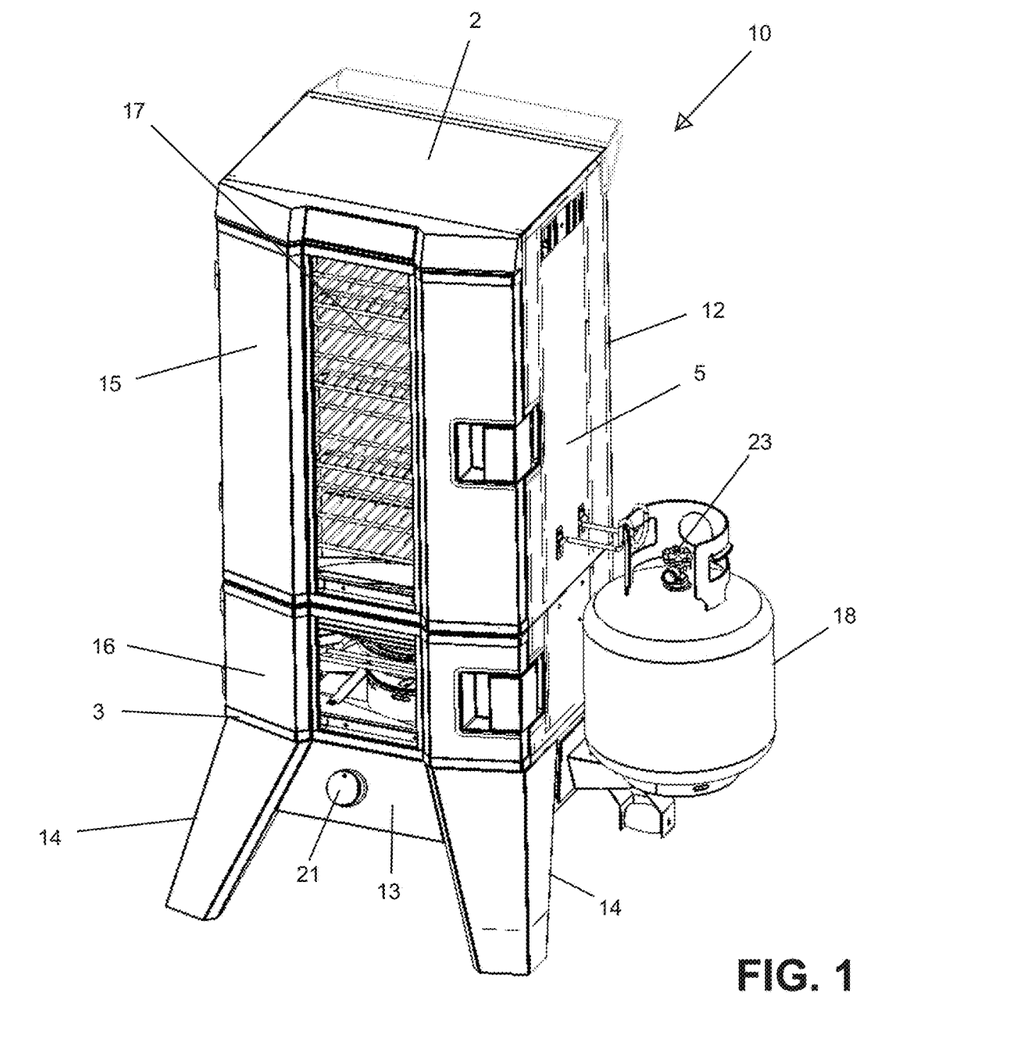
FIG. 1 is a front perspective view of a stand-alone gas smoker in accordance with the present invention.
Figure 2A:
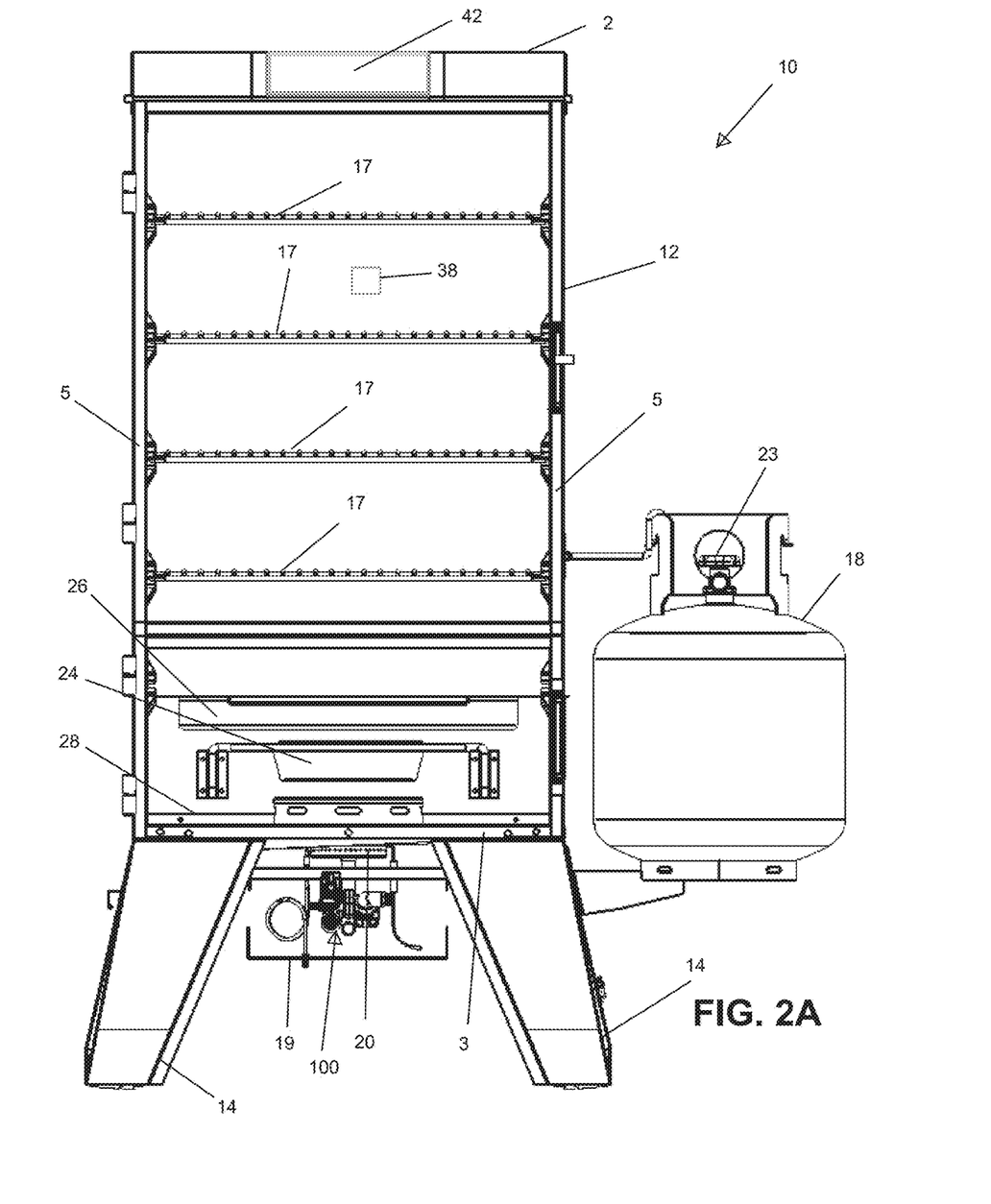
FIG. 2A is a front elevation view of the stand-alone gas smoker in accordance with the present invention and with the doors and the burner control mechanism panel removed to reveal internal detail of the smoker cabinet and the gas burner control mechanism.
Figure 2B:
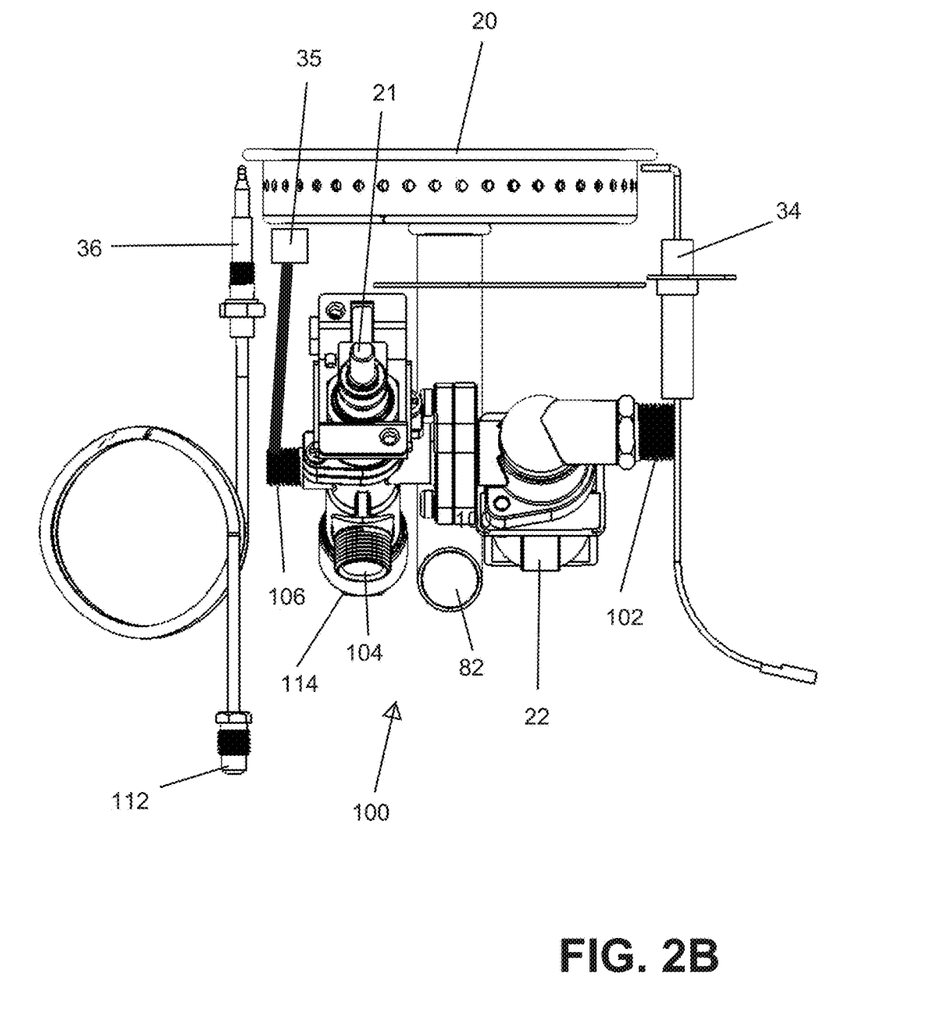
FIG. 2B is an enlarged front elevation view of the gas burner control mechanism of the stand-alone gas smoker in accordance with the present invention.
Figure 2C:
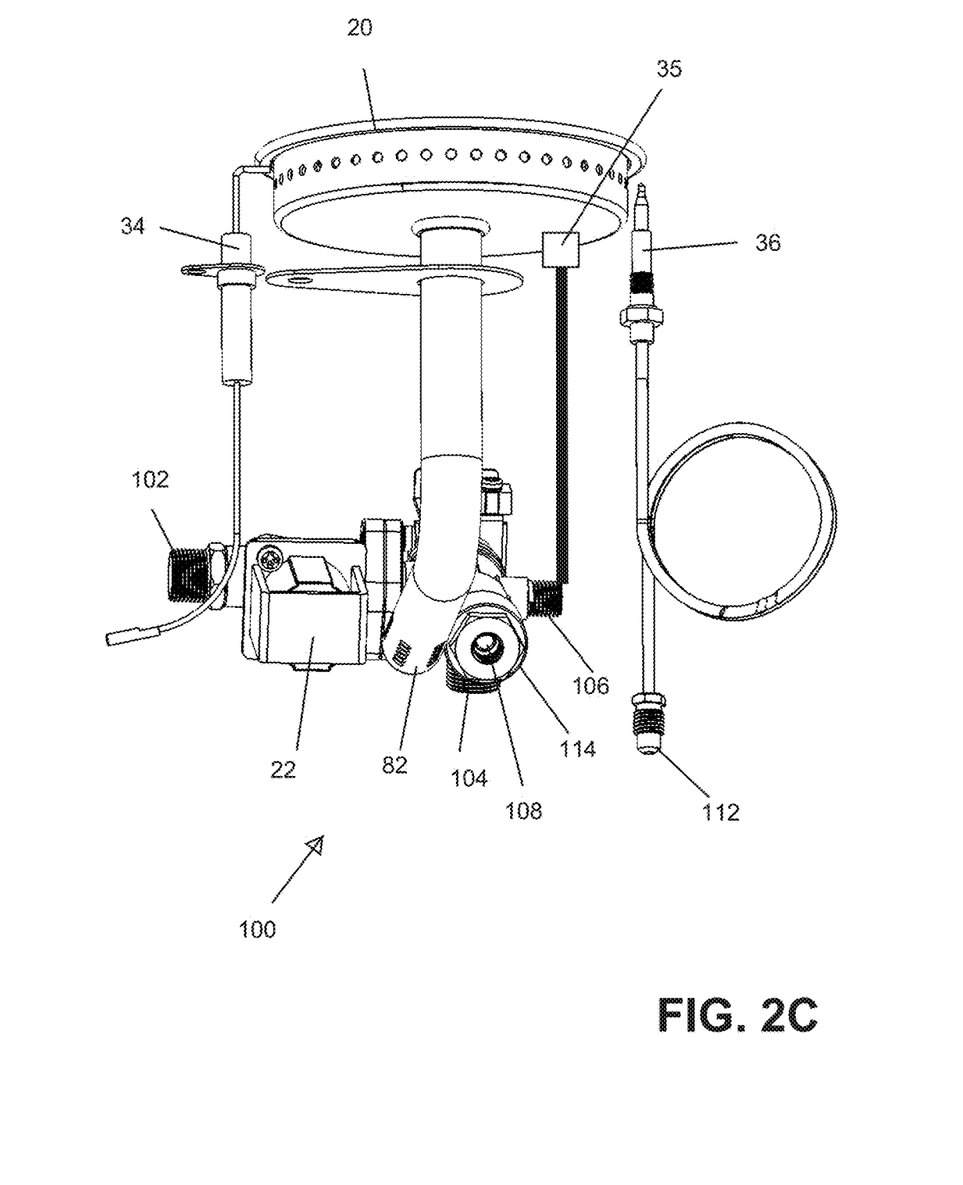
FIG. 2C is an enlarged back elevation view of the gas burner control mechanism of the stand-alone gas smoker in accordance with the present invention.
Figure 3:
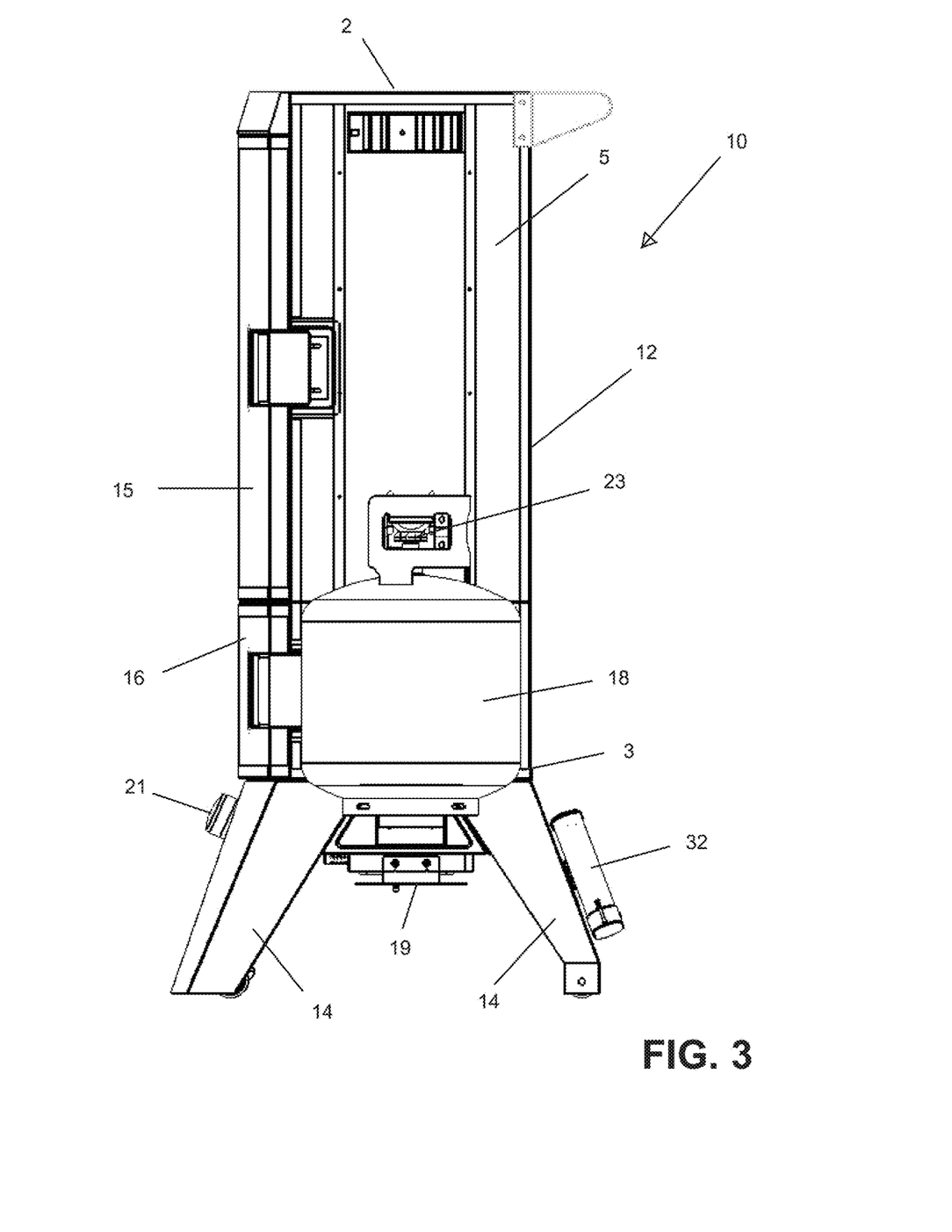
FIG. 3 is a right side elevation view of the stand-alone gas smoker in accordance with the present invention.
Figure 4:
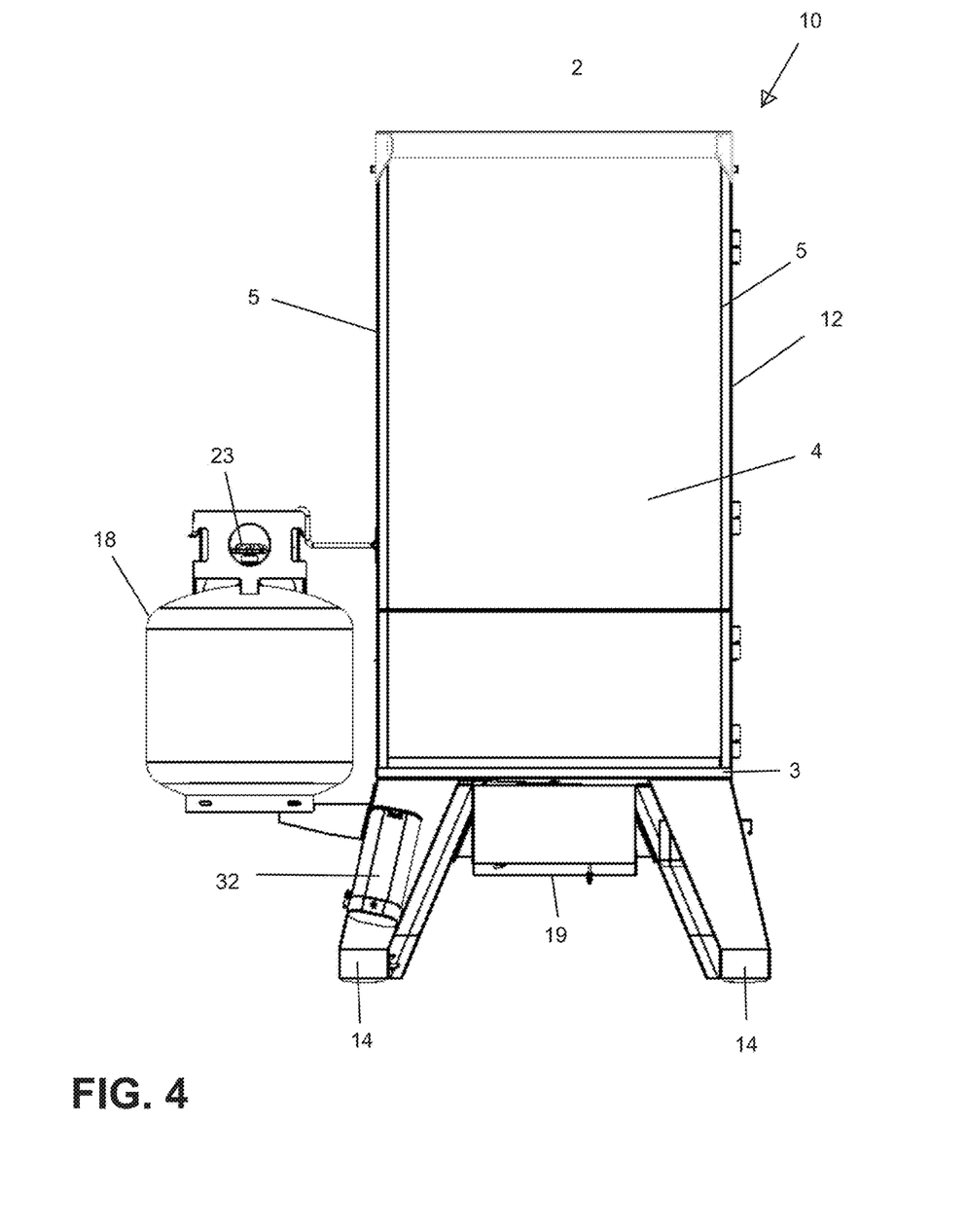
FIG. 4 is a back elevation view of the stand-alone gas smoker in accordance with the present invention.
Figure 5:
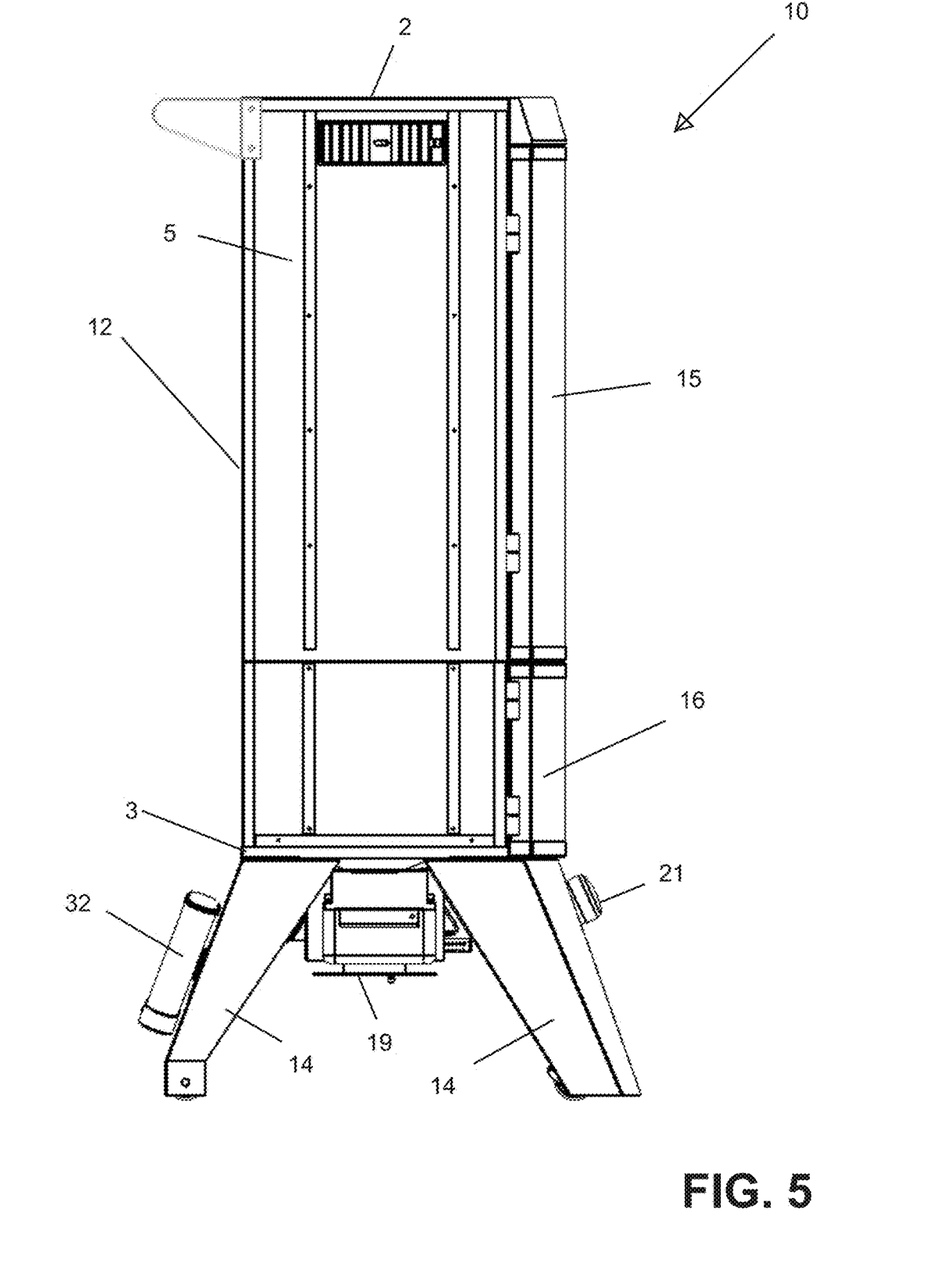
FIG. 5 is a left side elevation view of the stand-alone gas smoker in accordance with the present invention.
Figure 6:
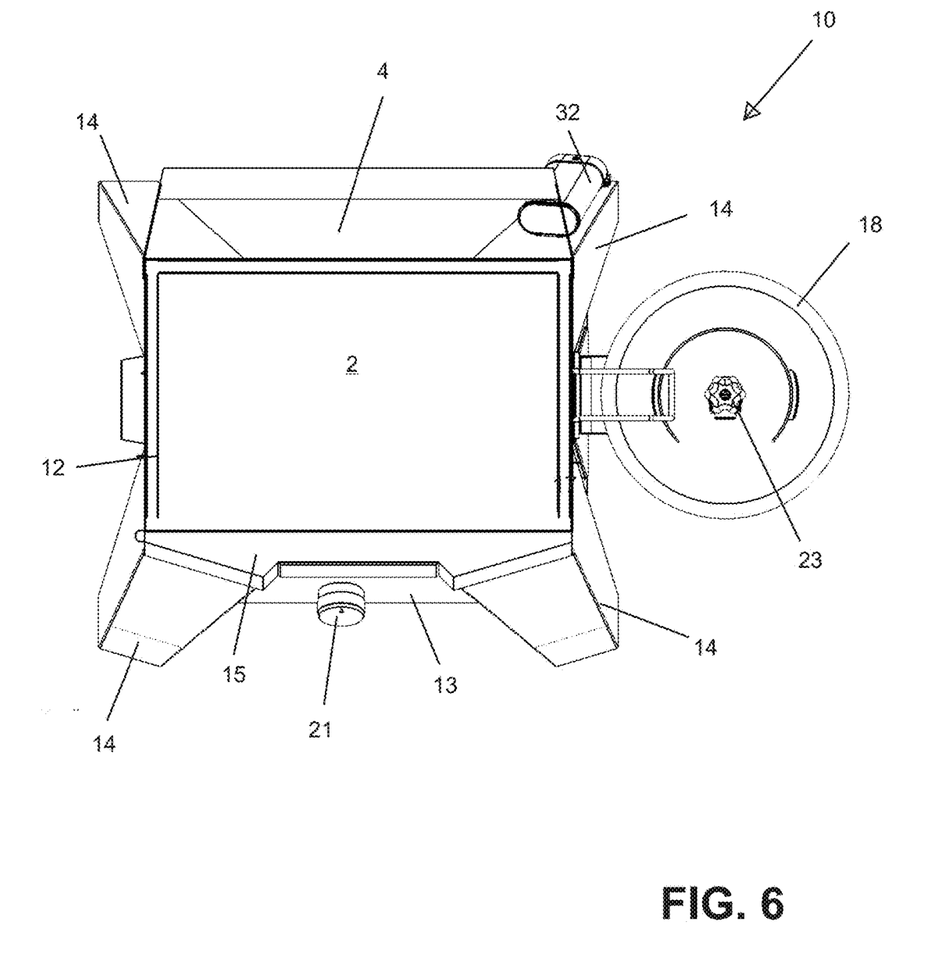
FIG. 6 is a top plan view of the stand-alone gas smoker in accordance with the present invention.
Figure 7:
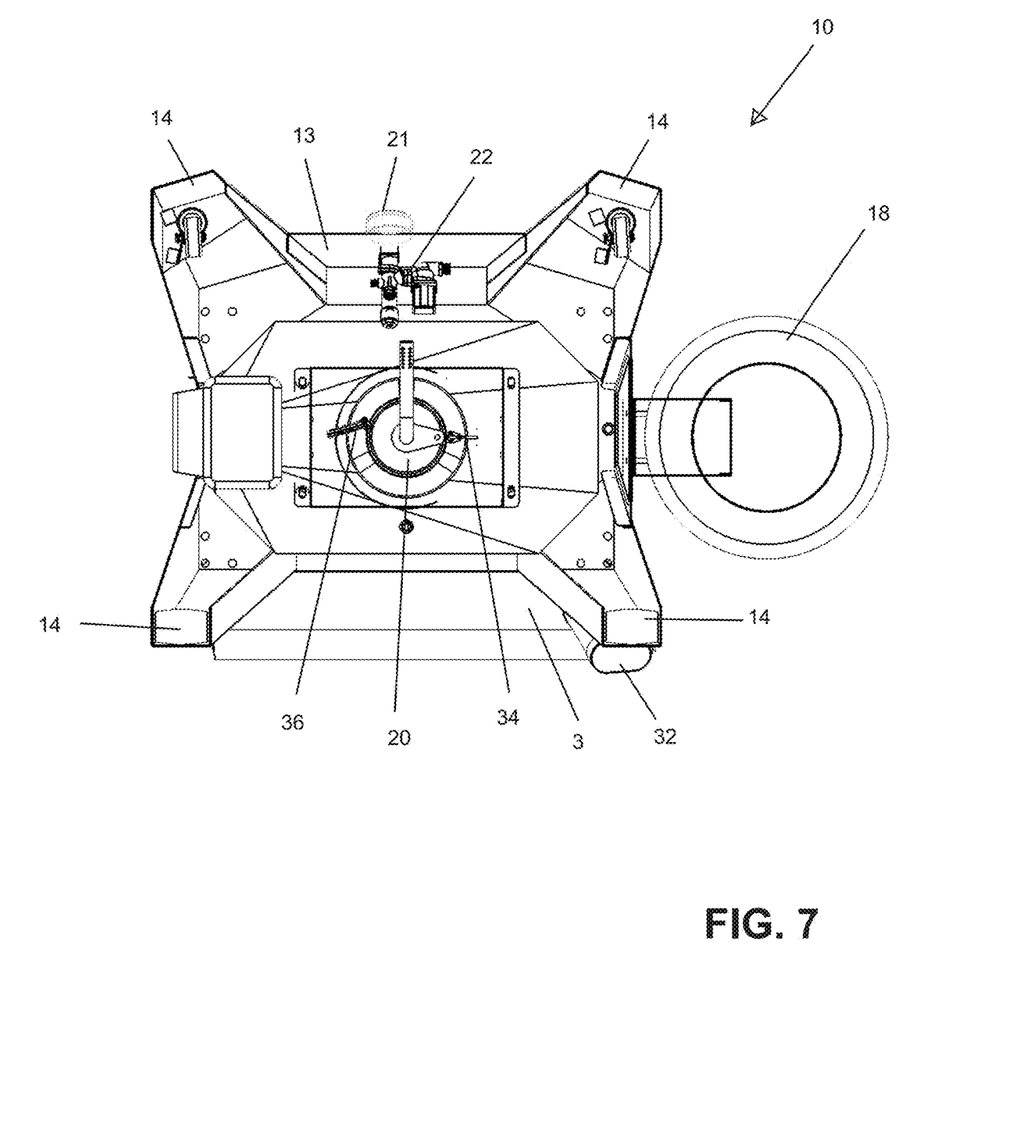
FIG. 7 is a bottom plan view of the stand-alone gas smoker in accordance with the present invention and with the heat shield and burner bracket removed to reveal internal detail of the gas burner control mechanism.

With reference to FIGS. 2A, 2B, and 3C, the burner control mechanism 100, located behind burner control mechanism panel 13, includes an igniter 34, a flame sensor 36 with male connector 112, a gas solenoid valve 22, a gas inlet 104, a gas outlet 102, a pilot light connection 106, a normally closed safety/ignition valve 114, and a control knob (stem) 21. The gas source 18 is connected through the manual control valve 23 to the gas inlet 104 of the burner control mechanism 100 by means of a flexible conduit (not shown). The gas inlet 104 connects the gas to the normally closed safety/ignition valve 114. When the safety/ignition valve 114 is open, gas flows to the pilot light 35 through the pilot light connection 106 and is also connected to the gas solenoid valve 22. When the gas solenoid valve 22 is opened, the gas can flow through the gas solenoid valve 22 to the gas outlet 102. The gas outlet 102 is connected to the burner tube 82 which in turn conducts the gas to the burner 20. The male sensor connector 112 is connected to the safety/ignition valve 114 through female sensor connector 108. The igniter 34 is either a piezo igniter that creates an ignition spark by mechanical force applied to the piezo crystal or the igniter 34 may be an electronically controlled spark device.

The thermocouple temperature sensor 36 determines if the pilot light 35 is lit or not. When the pilot light 35 is lit, the thermocouple temperature sensor 36 sends a pilot light signal to the safety/ignition valve 114 indicating that the pilot light 35 is lit. As long as the pilot light signal persists, the safety/ignition valve 114 remains open, and gas is delivered to the pilot light 35 through the pilot light connection 106. If the pilot light 35 goes out, the pilot light signal from the thermocouple temperature sensor 36 ceases, and the safety/ignition valve 114 reverts to its normally closed condition thereby precluding gas flow from the gas source 18 to the pilot light 35 and to the gas burner 20. Consequently, gas cannot build up inside the cabinet 12 thereby creating a fire and explosion hazard.

Figure 8:
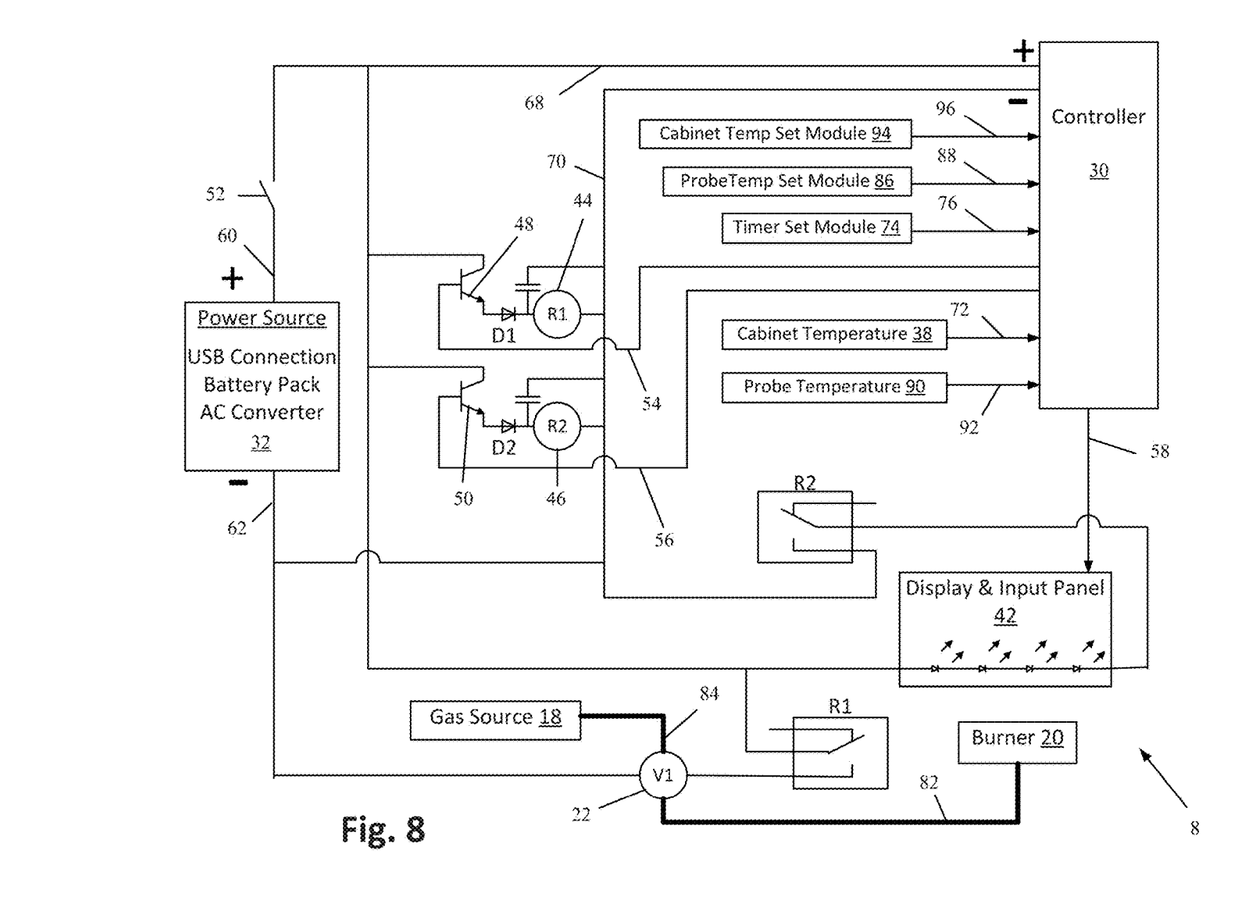
FIG. 8 is a schematic diagram of a control circuit for a first embodiment of a stand-alone gas smoker in accordance with the present invention.

With reference to FIG. 8, a first embodiment of the stand-alone gas smoker 10 has a control circuit 8 that includes a controller 30. The controller 30 controls the startup, operation, and shutdown of the stand-alone gas smoker 10. Particularly, the controller 30 cycles the gas burner 20 on and off in order to maintain a preset cooking temperature within an acceptable range within the cabinet 12. The control circuit 8 also includes a direct current (DC) power source 32, a display and input panel 42 for displaying the status of the operation of the smoker 10 and for accommodating user input, a cabinet temperature sensor 38 for determining the temperature inside the cabinet 12, a probe temperature sensor 90 for determining the internal temperature of the food being cooked, a timer set module 74 for setting the cooking time for the smoker 10, a probe temperature set module 86 for setting the internal temperature of the food product based on the user's preference for the cooked food, a display control relay 46 for powering the display and input panel 42, and a burner control relay 44 for cycling the gas burner 20 on and off.

The control circuit 8 is powered by the DC power source 32 with a positive terminal 60 and a negative terminal 62. An on-off switch 52 connects the power source 32 to the control circuit 8. The DC power source 32 may comprise standard batteries, a rechargeable battery pack, an alternating current (AC) converter, or a universal serial bus (USB) connection.

With respect to the controller 30, positive voltage from the power source 32 is connected to the controller 30 on controller input 68, and negative voltage from the power source 32 is connected to the controller 30 on controller input 70. Inputs to the controller 30 include a cabinet temperature set input 96 from a cabinet temperature set module 94, a cabinet temperature sensor input 72 from a cabinet temperature sensor 38, a probe temperature set input 88 from a probe temperature set module 86, a probe temperature sensor input 92 from a probe temperature sensor 90, and a timer set input 76 from a timer set module 74. Outputs from the controller 30 include a burner control output 54, a display control output 56, and a display data output 58. The cabinet temperature set module 94, the probe temperature set module 86, and the timer set module 74 are connected to the display and input panel 42 in order to accommodate user input.

In order to set the cabinet cooking temperature, normally 220° F.-230° F., the user, using the display and input panel 42, selects the cabinet temperature in that range by means of the cabinet temperature set module 94. The controller 30 receives an electrical signal from the cabinet temperature set module 94 on cabinet temperature set input 96 thereby setting the cooking temperature for the cabinet 12. The controller 30 receives an electrical signal from the cabinet temperature sensor 38 on the cabinet temperature sensor input 72 indicative of the temperature in the cabinet 12. Based on comparing the cabinet temperature to the cabinet set temperature, the controller 30 cycles the gas burner 20 on and off to maintain a cabinet temperature within an acceptable range including the temperature value set by the user.

In order to maintain that temperature in the cabinet 12 within an acceptable range of temperature, the cabinet temperature sensor 38 is located in the cabinet at a position where the sensed temperature reflects the average temperature within the cabinet 12. The cabinet 12 has a range of internal temperatures within the volume defined by the cabinet 12. In order to ensure consistent temperature sensing by the cabinet temperature sensor 38, the position of the average cabinet temperature is determined empirically for the cabinet 12 by positioning temperature sensors throughout the cabinet 12 and finding the location that accurately reflects the average of all of the temperatures found in the cabinet 12. Once the average temperature position has been determined, the temperature sensor 38 is placed at that location inside the cabinet 12.

The controller 30 controls the duration of the smoking process in two ways. In a probe temperature mode, the user, using the display and input panel 42, selects the internal temperature for the food product relating to the user's preference. Based on that input from the user, the probe temperature set module 86 sends an electrical signal proportional to that selected temperature on probe temperature set input 88 to the controller 30. The controller 30 receives the electrical signal from the probe temperature set module 86 on the probe temperature set input 88 corresponding to a temperature selected by the user for the final internal temperature of the food product based on the user's preference. The controller 30 receives an electrical signal from the probe temperature sensor 90 on probe temperature sensor input 92 indicative of the internal temperature of the food product being cooked and displays that sensed temperature on the display and input panel 42. Once the internal temperature of the food product reaches the value of the temperature set by the user using the probe temperature set module 86, the controller 30 terminates the smoking process by closing the gas solenoid valve 22 to extinguish the gas burner 20.

Alternatively, in a time mode, the controller 30 controls the duration of the cooking process based on elapsed time. In the time mode, the user, using the display and input panel 42 selects the time required to cook the food products to the user's taste. Based on that input from the user, the time set module 74 sends an electrical signal proportional to that selected time on time set input 76 to the controller 30. The controller 30 receives the electrical signal from the timer set module 74 indicative of a time value entered by the user for the duration of the cooking process. The timer set module 74 can either allow the user to manually set a time value for the duration of the cooking process, or the time set module 74 can determine a time value for the duration of the cooking process by using the computational capability of the controller 30. Particularly, cooking process inputs, such as the kind of food (beef, pork, poultry, etc.), the weight of the food, and the user preference (rare, medium, well done, etc.), can be entered by means of the display and input panel 42 and the time set module 74. Based on the input from time set module 74, the controller 30 can determine the time duration for the cooking process based on the selected cabinet temperature. The determination of the cooking time made by the controller 30 is based on empirically derived lookup tables that include, among others, the parameters listed above, namely kind of food, weight of the food, user preference, and cabinet temperature. Once the cooking time set by the timer set module 74 has elapsed, the controller 30 terminates the cooking process by closing the gas solenoid valve 22 and thereby extinguishing the gas burner 20.

Figure 9:
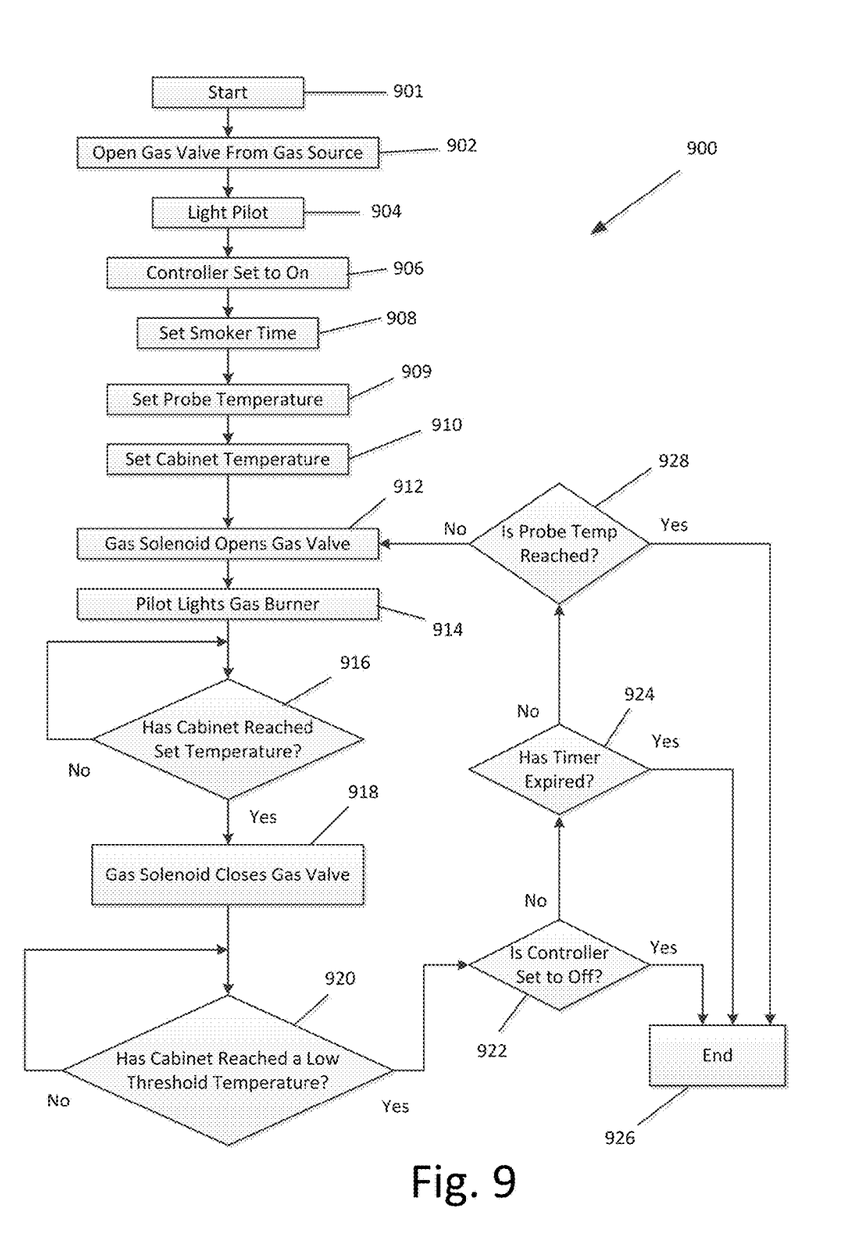
FIG. 9 is a flowchart showing the operation of the control circuit for the first embodiment of the stand-alone gas smoker in accordance with the present invention.

During the smoking process, the controller 30 controls the gas burner 20 and the display and input panel 42 in accordance with the method illustrated by the flowchart shown in FIG. 9. An output signal on the burner control output 54 from the controller 30 turns on transistor 48, which in turn energizes the relay coil 44. The relay coil 44 operates the relay contacts R1. The relay contacts R1, when operated by the relay coil 44, open the gas solenoid valve 22 allowing gas to flow from the gas source 18 through gas line 84 and a burner tube 82 to the burner 20. The pilot light 35 then lights the gas at the gas burner 20.

An output signal on display control output 56 of the controller 30 turns on transistor 50, which in turn energizes the relay coil 46. The relay coil 46 operates the relay contacts R2, and the closed contacts R2 energize the display and input panel 42. The display on the display and input panel 42 is controlled by data transmitted from the controller 30 to the display and input panel 42 from display data output 58. The data transmitted from the controller 30 to the display and input panel 42 may display, for example, the cabinet temperature, the status of the gas burner 20, the status of the pilot light 35, the amount of flammable gas in the gas source 18, the status of the DC power source, the amount of time elapsed since the beginning of the cooking process, the amount of time remaining in the cooking process, and the internal temperature of the food product measured by the probe temperature sensor 90.

FIG. 9 illustrates the operating method 900 for the control circuit 8 (FIG. 8). The operating method 900 begins at step 901 and proceeds to step 902 where the user opens the manual gas valve 23 (FIGS. 1, 2, 3, 4, and 6) on the gas source 18. At step 904, user lights the pilot light 35 by pushing in the control knob 23 and turning the control knob 23 to the pilot position. Gas from the gas source 18 flows through the safety/ignition valve 114, through the pilot light connection 106, and to the pilot light 35. The igniter 34 ignites the gas at the pilot light 35. The user holds the gas control knob 23 in the pilot position until the thermocouple flame sensor 36 is sufficiently heated by the pilot light 35 to maintain gas flow through the safety/ignition valve 114 to the pilot light 35. With the pilot light 35 lit, at step 906, the user turns the control knob 23 from the pilot position to the on position, which in turn closes switch 52 and connects power to the controller 30 and allows gas to enter to the closed solenoid valve 22.

At subsequent step 908, the user sets the cooking time for the stand-alone gas smoker 10 by means of the display and input panel 42 and the time set module 74. Alternatively, at step 909, the user sets the probe temperature, by means of the display and input panel 42 and the set probe temperature set module 86, to a value relating to the user's preference for the internal temperature of the food product when done. At step 910, the user sets the temperature for the cabinet 12 by means of the display and input panel 42 and the cabinet temperature set module 94.

From step 910, the method moves to step 912 where the solenoid gas valve 22 is opened by the R1 contacts, and gas flows to the gas burner 20. At step 914, the pilot light 35 lights the gas burner 20.

From step 914, the method moves to decision step 916. At decision step 916, the method determines if the cabinet 12 has reached the set cabin temperature (set at step 910) based on information provided by the cabinet temperature sensor 38. If the cabinet temperature has not reached the set temperature, the method then follows the "no" branch and cycles back to decision step 916. If, on the other hand, the temperature in the cabinet has reached the set temperature (set at step 910), the method follows the "yes" branch to step 818 where the solenoid gas valve 22 is closed thus extinguishing the burner 20 but leaving the pilot light 35 burning.

From step 918 the method proceeds to decision step 920. At decision step 920, the controller 30 determines if the temperature in the cabinet 12 has dropped to a predetermined low threshold temperature requiring restart of the burner 20. The low threshold temperature is a temperature value preprogrammed into the controller 30 and relates to the cabinet temperature set by the user. If the cabinet temperature has not dropped to the low threshold temperature, the method then follows the "no" branch and cycles back to decision step 920. Once the temperature in the cabinet 12 has dropped to the low threshold temperature, the method follows the "yes" branch to decision step 922.

At decision step 922, the method determines if the control knob 21 has been set to off by the user. If the control knob 21 has been set to off, the method follows the "yes" branch to step 926 where the control sequence ends with the gas burner 20 turned off. If on the other hand the control knob and 21 has not been set to off, the method follows the "no" branch to decision step 924.

At decision step 924, the controller 30 determines if the time set at step 908 has expired. If the time has expired, the method follows the "yes" branch, and the method ends at step 926. If the other hand the time has not expired, the method follows the "no" branch from step 924 to decision step 928. At decision step 928, the method determines whether the set probe temperature (set at step 909) has been reached. If the set probe temperature has been reached, the method follows the "yes" branch and ends at step 926. If on the other hand, the set probe temperature has not been reached at step 928, the method follows the "no" branch to step 912. At step 912, the controller 30, via a signal on the burner control output 54, opens the gas valve 22 in order to relight the burner 20 to bring the cabinet 12 back up to the set temperature (set at step 910).

Figure 10:
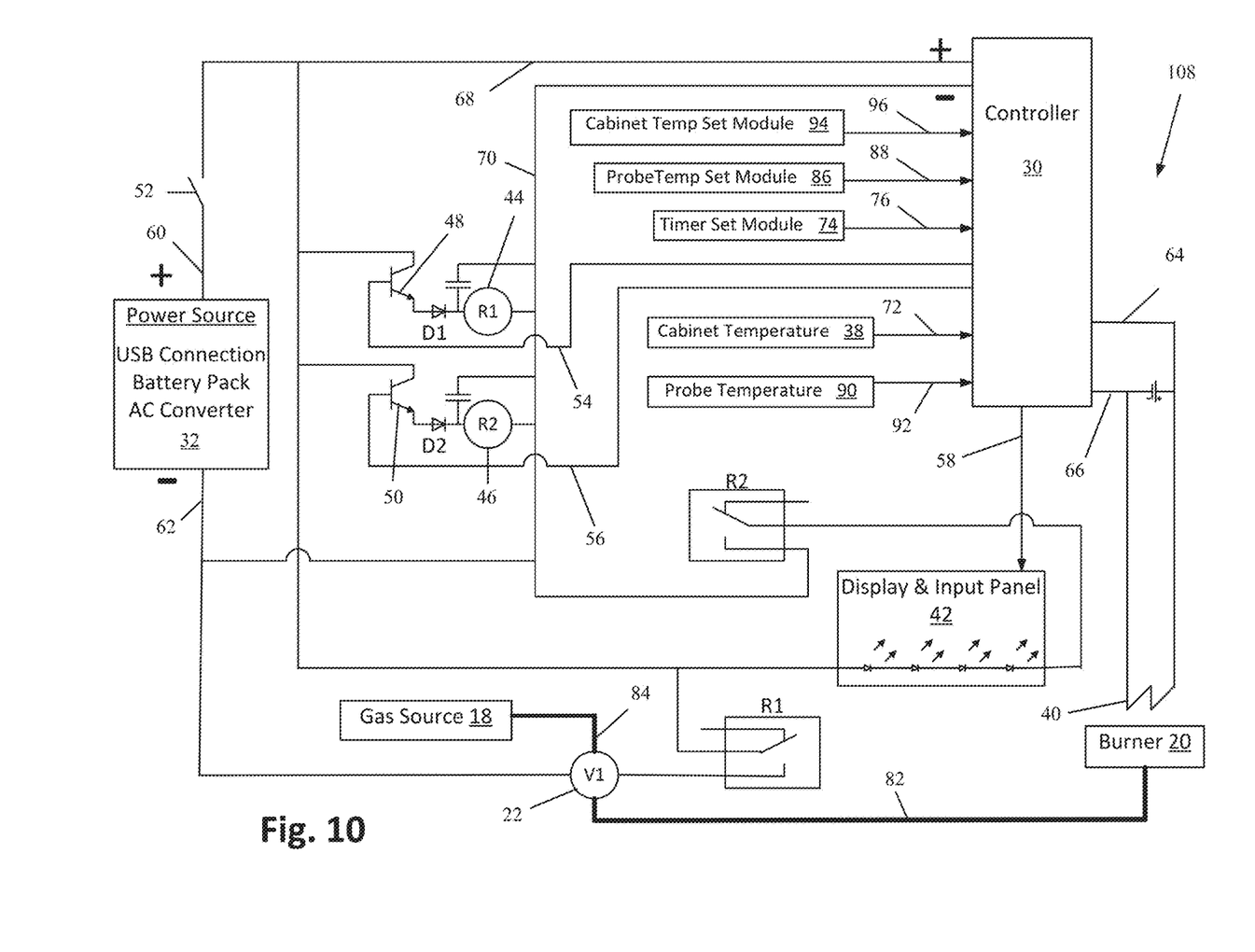
FIG. 10 is a schematic diagram of a control circuit for a second embodiment of a stand-alone gas smoker in accordance with the present invention.

FIG. 10 illustrates a second embodiment of the invention having a control circuit 108 for the gas-fired gas smoker 10. In FIG. 10, the same reference numerals refer to the same parts that are used with the control circuit 8 shown in FIG. 8. The control circuit control circuit 108 is the same as control circuit 8 of FIG. 8 except for the inclusion of a thermal electric generator 40. The thermal electric generator 40 is implemented by a Seebeck thermal electric generator. The thermal electric generator 40 charges the rechargeable battery pack of the DC power source 32 and provides power for auxiliary lighting or for recharging electronic devices.

Particularly, the Seebeck thermal electric generator 40 has a positive terminal 64 and a negative terminal 66. The Seebeck thermal electric generator 40 converts the heat of the gas-fired smoker 10 into electric energy at the terminals 64 and 66. The positive terminal 64 and the negative terminal 66 of the Seebeck thermal electric generator 40 are connected through the controller 30 to the rechargeable battery pack of the power source 32. The controller 30 controls the delivery of electric energy from the Seebeck thermal electric generator 40 to the rechargeable battery to protect against overcharging the rechargeable battery of the power source 32 and to regulate the power available for auxiliary lighting and for other electronic devices.

While this invention has been described with reference to preferred embodiments thereof, it is to be understood that variations and modifications can be affected within the spirit and scope of the invention as described herein and as described in the appended claims.

We claim:

1. A gas-fired smoker for cooking a food product using a smoking process comprising:
   a. a cabinet with a top, a bottom, sides, a back, an access door, and at least one rack vertically located within the cabinet for holding the food product to be cooked;
   b. a gas burner located adjacent the bottom and connected to a source of flammable gas by means of a gas valve;
   c. a pilot light for igniting the flammable gas at the gas burner; and
   d. a control circuit including:
      i. a controller;

ii. a DC power source for powering the control circuit including the controller;
iii. a temperature set module connected to the controller for setting a cabinet temperature value for the cabinet temperature inside the cabinet;
iv. a temperature sensor connected to the controller for sensing the cabinet temperature inside the cabinet, wherein the temperature sensor is located in the cabinet at a position representative of the average temperature within the cabinet based on averaging a plurality of different temperatures measured in the cabinet;
v. a display connected to the controller;
vi. wherein the controller:
(a) in response to sensing the cabinet temperature and based on the cabinet temperature value set by the temperature set module, controls the gas valve to start the gas burner and to extinguish the gas burner in order to maintain a range of cabinet temperatures related to the cabinet temperature value set by the temperature set module; and
(b) controls the display to display parameters selected from the cabinet temperature inside the cabinet, status of the gas burner, status of the pilot light, status of the source of flammable gas, or status of the DC power source.

2. The gas-fired smoker of claim 1, further comprising a time set module for setting a cooking time value relating to a time required to cook the food product and wherein the controller in response achieving the cooking time value set by the time set module extinguishes the gas burner and wherein the controller controls the display to display parameters selected from an elapsed cooking time or a remaining cooking time.

3. The gas-fired smoker of claim 2, wherein the cooking time value is determined by the controller using lookup tables that include parameters selected from the cabinet temperature value, the kind of food being smoked, the weight of the food being smoked, or the user preference for results of the smoking process.

4. The gas-fired smoker of claim 1, further comprising a probe temperature set module for setting a probe cooking temperature value for the food product based on user preference and wherein the controller, in response to achieving the probe cooking temperature value set by the probe temperature set module, extinguishes the gas burner and wherein the controller controls the display to display a current probe cooking temperature.

5. The gas-fired smoker of claim 1, wherein the DC power source includes a rechargeable battery pack and wherein the smoker further includes a thermal electric generator for converting heat from the gas burner into electric power for recharging the rechargeable battery pack.

6. The gas-fired smoker of claim 5, wherein the thermal electric generator is a Seebeck thermal electric generator.

7. The gas-fired smoker of claim 5, wherein the DC power source includes a USB port for powering external devices.

* * * * *